United States Patent
Rhodes

(10) Patent No.: US 8,904,586 B2
(45) Date of Patent: Dec. 9, 2014

(54) SLOW SPEED DRIVE METHOD FOR AN ELECTRONICALLY COMMUTATED MOTOR, CONTROLLER IMPLEMENTING SAME, WASHING MACHINE INCORPORATING SAME

(75) Inventor: David Charles Rhodes, Auckland (NZ)

(73) Assignee: Fisher & Paykel Appliances Limited, Auckland (NZ)

( * ) Notice: Subject to any disclaimer, the term of this patent is extended or adjusted under 35 U.S.C. 154(b) by 1160 days.

(21) Appl. No.: 12/741,102

(22) PCT Filed: Nov. 5, 2008

(86) PCT No.: PCT/NZ2008/000298
§ 371 (c)(1),
(2), (4) Date: Aug. 27, 2010

(87) PCT Pub. No.: WO2009/061220
PCT Pub. Date: May 14, 2009

(65) Prior Publication Data
US 2010/0313609 A1  Dec. 16, 2010

Related U.S. Application Data

(60) Provisional application No. 60/986,359, filed on Nov. 8, 2007.

(51) Int. Cl.
*D06F 33/02* (2006.01)
*D06F 37/30* (2006.01)
*H02P 6/08* (2006.01)
*H02P 3/18* (2006.01)

(52) U.S. Cl.
CPC .............. *H02P 6/085* (2013.01); *D06F 37/304* (2013.01); *D06F 33/02* (2013.01); *H02P 3/18* (2013.01)
USPC .............................. 8/158; 68/12.02; 68/12.16

(58) Field of Classification Search
USPC ........................... 68/12.02, 12.16; 8/158, 159
See application file for complete search history.

(56) References Cited

U.S. PATENT DOCUMENTS

| | | | |
|---|---|---|---|
| 4,857,814 A | 8/1989 | Duncan | |
| 4,986,092 A * | 1/1991 | Sood et al. | 68/12.01 |
| 5,510,688 A | 4/1996 | Schwarz | |
| 5,821,708 A | 10/1998 | Williams et al. | |
| 6,029,300 A * | 2/2000 | Kawaguchi et al. | 8/159 |
| 6,060,851 A | 5/2000 | Imai et al. | |
| 6,337,548 B2 | 1/2002 | Kawabata et al. | |
| 6,495,980 B2 * | 12/2002 | Cho et al. | 318/400.02 |
| 7,065,905 B2 | 6/2006 | Guinibert et al. | |
| 8,035,332 B2 * | 10/2011 | Filippa et al. | 318/757 |
| 8,621,893 B2 * | 1/2014 | Ko et al. | 68/12.06 |

(Continued)

OTHER PUBLICATIONS

International Search Report, May 28, 2009.

*Primary Examiner* — Joseph L Perrin
(74) *Attorney, Agent, or Firm* — Clark Hill PLC

(57) ABSTRACT

Provided is a method of operating a motor at a low speed. The method includes sensing an event corresponding to an angular position of the motor. If the event occurs between a first time threshold and a second time threshold, the method includes slowing the motor. If the event has not occurred by the first time threshold, the method includes increasing driving power to the motor.

32 Claims, 5 Drawing Sheets

(56) References Cited

U.S. PATENT DOCUMENTS

| | | | |
|---|---|---|---|
| 2002/0050011 A1* | 5/2002 | Cho et al. | 8/159 |
| 2005/0076456 A1* | 4/2005 | Lee et al. | 8/159 |
| 2005/0102765 A1* | 5/2005 | Jeong et al. | 8/158 |
| 2005/0268670 A1* | 12/2005 | Hirasawa et al. | 68/12.06 |
| 2006/0207299 A1* | 9/2006 | Okazaki et al. | 68/12.02 |
| 2006/0250104 A1* | 11/2006 | Reichert et al. | 318/651 |
| 2009/0058348 A1* | 3/2009 | Ryu | 318/639 |
| 2009/0199598 A1* | 8/2009 | Kanazawa | 68/12.04 |

* cited by examiner

TABLE OF EXPECTED HALL PATTERNS

| PATTERN # | A | B | C |
|---|---|---|---|
| 0 | 1 | 0 | 1 |
| 1 | 1 | 0 | 0 |
| 2 | 1 | 1 | 0 |
| 3 | 0 | 1 | 0 |
| 4 | 0 | 1 | 1 |
| 5 | 0 | 0 | 1 |

← PHASE THAT DIGITAL SIGNAL IS FROM

FIGURE 4

SLOW SPEED DRIVE METHOD FOR AN ELECTRONICALLY COMMUTATED MOTOR, CONTROLLER IMPLEMENTING SAME, WASHING MACHINE INCORPORATING SAME

This application is a United States National Phase filing of PCT/NZ2008/000298, having an International filing date of Nov. 5, 2008 which was published in English on May 14, 2009 under International Publication Number WO 2009/061220 which claims the benefit of U.S. provisional patent application Ser. No. 60/986,359, filed on Nov. 8, 2007. These applications are hereby incorporated by reference in their entirety.

FIELD OF THE INVENTION

This invention broadly relates to methods and apparatus for controlling electronically commutated motors and in particular, but not solely, to methods and apparatus for controlling electronically commutated motors used for driving laundry appliances.

BACKGROUND

Some whiteware appliances, such as horizontal axis washing machines, have a wash drum that rotates around a central horizontal axis. The drum can be directly rotated by a motor fixed to the rear wall of the drum. Alternatively, the wash drum can be rotated by a motor located proximate the drum and coupled to it via an appropriate drive mechanism, for example, a belt and pulley transmission.

One type of motor now used in the whiteware industry is an electronically commutated brushless external rotor motor. Electronically commutated motors are described in further detail in U.S. Pat. No. 5,821,708, the contents of which are hereby incorporated by reference. Such electronically commutated motors are designed to typically operate at speeds of up to 1000 rpm or more.

Low speed rotation of the drum is required in some machines described in the prior art to enable tasks such as washing machine door opening or closing procedures. For example, a door opening procedure requiring low speed rotation is described in U.S. Pat. No. 7,065,905. Low speed rotation may also be used to allow fluid to slowly drain from a wash drum as it rotates. Such fluid could be residual wash fluid, or fluid that has been captive within balancing chambers during wash cycles. Low speed rotation, however, has inherent difficulties.

One such difficulty of low speed rotation of the motor is increased risk of the motor stalling. Stalling is undesirable due to the large amounts of electrical energy required to reinitiate rotation. Stalling may occur due to an unbalanced wash load distributed within the wash drum. As the wash load is lifted by the drum, the increasing weight may cause the motor to decelerate and stall.

Similarly, another difficulty arises as the wash load begins to travel downward. The motor may accelerate undesirably. The acceleration may cause, for example, heavy collisions at the end of a door opening procedure.

SUMMARY OF THE INVENTION

In a first aspect, the present invention may broadly be said to consist a method of operating a motor, the method comprising:

sensing an event corresponding to an angular position of said motor, wherein
if the event occurs between a first time threshold and a second time threshold, the method comprises slowing the motor, and
if the event has not occurred by the first time threshold, the method comprises increasing the drive power to the motor.

In a second aspect, the present invention may broadly be said to consist a motor control system adapted to operate a motor, the system comprising:

a sensor adapted to sense an event that corresponds to an angular position of said motor, wherein
if the event occurs between a first time threshold and a second time threshold, the method comprises slowing the motor, and
if the event has not occurred by the first time threshold, the method comprises increasing the drive power to the motor.

Preferably said motor is an electronically commutated motor operated at a speed significantly reduced from a typical operating speed.

Preferably the first time threshold is a desired time between events.

Preferably the second time threshold that is less than said first time threshold.

Preferably the second time threshold that is between 80% and 95% of said first time threshold.

Preferably the event is a series of events that correspond to change in angular position of said motor.

Preferably the driving power to the motor is increased if the event has not occurred by the second time threshold.

Preferably the driving power to the motor is increased if the event has not occurred by the first time threshold.

Preferably the motor is braked until the elapse of the first time threshold if the event occurs before the first threshold.

Preferably and the driving power to said motor is decreased if the event occurs before said second threshold.

Preferably the motor is adapted to drive a horizontal axis washing machine.

Preferably the event is a signal from one or more position sensing devices position proximate the motor rotor to sense the rotation of said rotor.

Preferably the event is a pattern change in an electronically commutated motor driver.

Preferably the typical motor operating speed is approximately 1000 rpm.

Preferably said speed significantly below said normal operating speed is less than 20 rpm.

This invention may also be the broadly to consist in the parts, elements and features referred to or indicated in the specification of the application, individually or collectively, and any or all combinations of any two or more of the parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the forgoing and also envisages constructions of which the following gives examples.

BRIEF DESCRIPTION OF THE DRAWINGS

A preferred embodiment of the invention will now be described with reference to the accompanying drawings.

FIG. 4 is a table of expected hall patterns

DETAILED DESCRIPTION

Figure 1:
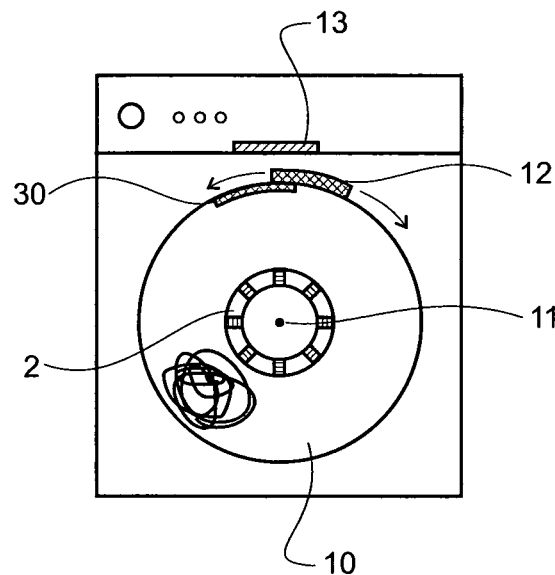
FIG. 1 illustrates a top loading, horizontal axis washing machine.

FIG. 1 illustrates a top loading, horizontal axis washing machine. The washing machine has a wash drum 10 that rotates about a horizontal axis 11. A drum hatch 12 is positioned in the outer circumference of the wash drum to cover an access port 30. The drum hatch 12 slides on the outer wash drum surface to cover and uncover the port 30. The access port 30 is aligned with a door 13 in the top surface of the washing machine to provide an opening that allows a user to load and unload the wash drum 10.

A motor 2 facilitates rotation of the wash drum 10. The motor 2 is coupled to an end wall of the drum 10. Alternatively, the motor 2 may be located proximate the drum and coupled to it via an appropriate drive mechanism.

The motor 2 has an external rotor 20 that rotates about a central stationary stator assembly 21. The central stator 21 supports a plurality of windings 23 that are selectively energised or commutated. Magnets 22 are arranged around the circumference of the rotor 20 to react to the energised windings and cause rotation the rotor 20. The motor is designed to usually operate at speeds of up to 1000 rpm or more during typical appliance cycles, for example, a washing machine spin cycle.

Preferably a rotation sensing device is arranged proximate to the rotor. The rotation sensing device tracks the rotation of the rotor 20 by emitting a signal relating to the rotor 20 movement. The sensing device may sense relative or absolute movement of the rotor. Further, more than one position sensing device can be used to provide increased rotation signal resolution.

The two most commonly used devices for sensing rotor position are electromagnetic or optical sensors.

A suitable electromagnetic sensor may be a Hall Effect sensor. An external rotor motor magnet passing nearby a Hall Effect sensor generates an electrical current in that sensor. A Hall Effect sensor arranged proximate the magnets in a motor 2 can be used to detect the rotation of the motor 2. A changing electrical current in the Hall Effect sensor indicates the magnets in the motor are moving relative to the sensor. The changing sensor signal may then be interpreted to determine motor position.

A suitable optical sensor arrangement includes a light source facing the rotor 20. The rotor 20 periodically reflects light to a light sensitive device that generates or changes a flow of electrical current. Suitable light and dark patterns on the rotor can provide accurate position feedback.

Back-EMF is used to track the position of a multiphase electric motor. The use of back EMF position sensing is described in detail in U.S. Pat. No. 5,821,708 which is incorporated by reference. It is possible to use Back-EMF to detect rotor position while the rotor is rotating at very low speeds in the 5 to 20 rpm range. However, the electronics must be much more sensitive than that used when driving the motor at higher speeds. In addition, at near-zero speeds the back-EMF level drops to near-zero. For these reasons, while back-EMF is an option, the position sensing apparatus previously described provide a better solution to position tracking at very low and near-zero speeds.

Figure 2:
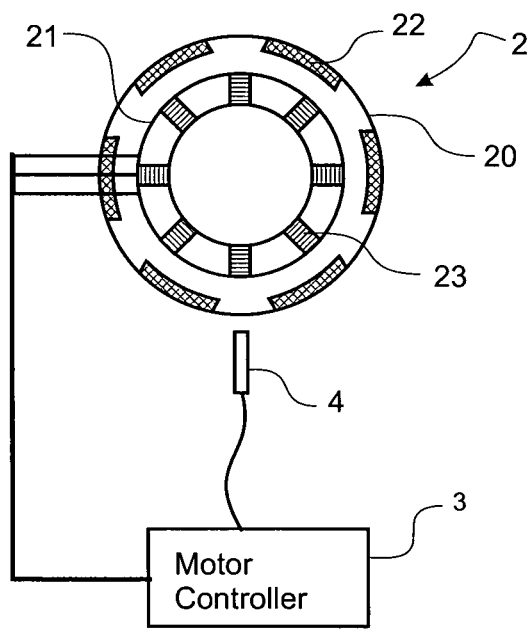
FIG. 2 illustrates an example motor used in the whiteware industry.

FIG. 2 illustrates an external rotor motor 2 having magnets 22 positioned circumferentially around a rotor 20. The rotor 20 rotates around a central stator 21. The stator 21 supports a plurality of windings 23 that are selectively energised to drive the rotor.

One or more rotation sensing devices 4 are positioned proximate to the magnets 22 on the rotor 20. Preferably the rotation sensing device 4 comprises a plurality of Hall Effect sensors. Each of the Hall Effect sensors outputs a signal that corresponds to a magnet 22 passing the sensor 4 as the motor 2 rotates. In the preferred embodiment three Hall Effect sensors are circumferentially offset to create a predefined temporal delay between the signals from each sensor 4 if the rotor 20 is rotating at a constant speed.

The Hall Effect sensor provides an alternating high or low signal as the magnet passes. The output signal from each Hall Effect sensor is converted to a bi-level signal by applying a threshold. For example, a 'high' signal is output when the signal level output from a Hall sensor is above the threshold level. Similarly, a 'low' signal is output when the signal level output from a Hall sensor is below the threshold. Typically, the threshold level is zero volts, or as close as possible thereto. The threshold can be applied electronically by the use of a comparator, logic gates or diode circuits.

FIG. 4 shows a table of patterns output from the three Hall Effect devices. The three Hall Effect sensors A, B, C produce a three-bit pattern, or six individual patterns, 0-5. Each pattern corresponds to a particular electrical angle of the rotor relative to the stator. Each electrical angle, or pattern, has a particular commutation pattern associated with either driving or braking the rotor. The use of patterns to control an electronically commutated motor is described in further detail in U.S. Pat. No. 5,821,708.

The electrical angle of the rotor is relative to any particular set of windings and magnets. In a 3-phase motor having, for example, 56 magnets of alternating polarity and three windings, one physical revolution of the motor will involve 28 electrical cycles, or 168 Hall Effect pattern changes.

The electrical power supplied to the motor, and thus the motor power can be controlled, for example, by modulating the commutation signal with a PWM signal. The PWM signal can also be supplied by the motor controller.

Figure 3:
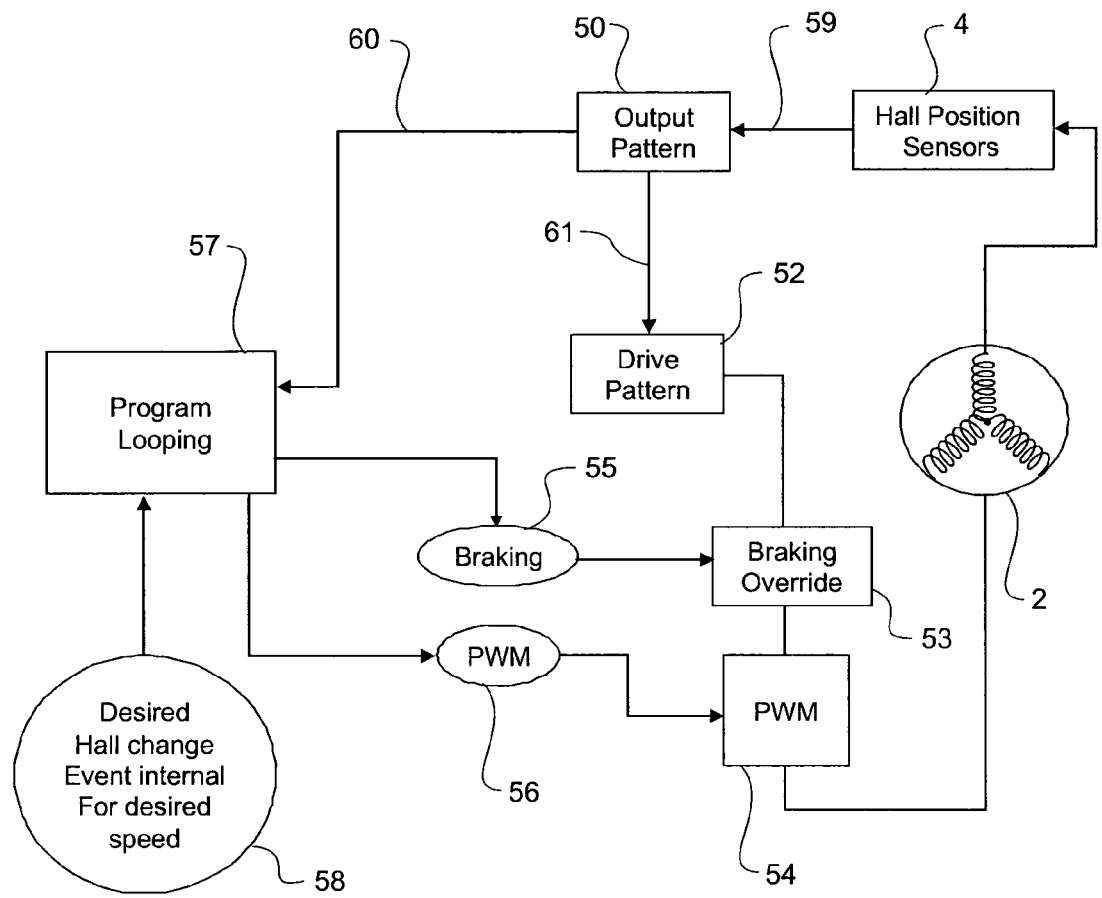
FIG. 3 illustrates a flow diagram of operations of the motor controller of FIG. 2.

FIG. 3 illustrates a functional block diagram of an example motor controller usable with at least one embodiment of the present invention. The motor 2 includes position sensors 4 that output signals on wires 59 generated by the rotation of the rotor 20. Preferably the position sensors 4 are three Hall Event sensors positioned proximate the rotor magnets 22.

The Hall Event signals are received by output pattern block 50. The output pattern block 50 applies a threshold to the Hall Event signals to generate a 3 bit number representing the position signal pattern. The digitised output pattern is then easily directed to other digital logic circuits such as a motor commutation controller 3.

The output pattern signal from block 50 is supplied to the drive pattern block 52 on link 61 and to the program looping block 57 along link 60. The drive pattern block 52 outputs a commutation signal to drive the motor according to the rotor position as indicated by the pattern received from block 50. The 3 bit pattern position signal and commutation patterns are described in further detail in U.S. Pat. No. 5,821,708.

The links may be physical wires, internal connections in a microprocessor, tracks on a printed circuit board or other appropriate connecting devices or materials. Alternatively, the functionality of the motor controller blocks may be included in firmware of a programmable controller. Here, the links are representative of the program flow.

Typical whiteware appliances already contain suitable microprocessors that can be programmed to include the functionality of the software algorithm and motor controller blocks. This functionality can therefore be retrospectively added into suitable existing appliances if required. In addition, the program flow may be adapted to any appropriate motor controller where there already exists the ability to accelerate and brake an electronically commutated motor.

Integrating all of the functional blocks of FIG. 3 into a single microprocessor would provide an effective solution. However, various functional blocks may be excluded from the microprocessor and alternatively implemented by other forms of hardware or software. For example, the motor control functions may be performed by an independent motor driver circuit.

Referring again to FIG. 3, program looping block 57 stores a first threshold variable representing a desired time period (T) between hall event signal periods. For example, if there are 168 pattern changes per motor rotation and the motor is rotating at 10 rpm, the desired time period T will be approximately 35 ms between pattern changes. Alternatively, time period T may be the average time of a number of previous pattern change intervals. Alternatively, the time period T may be a time period predicted by extrapolating previous pattern change time intervals.

The desired time T is a variable input 58 into the main loop that is processed by the program looping block 57. The time T is typically derived from the desired motor speed parameter and may be a constant time period, or it may change according to speed fluctuations in the motor.

The motor controller also stores a second threshold variable, Z, representing a fraction of desired time period T. Variable Z is tailored to the particular application of the motor, or the operation speed of the motor, or both. The inventors have ascertained that a value of Z between 80% and 95% of period T is suitable for slow speed motor drive of approximately 5 rpm to 20 rpm. However, Z could be any suitable fraction of period T. The variable Z controls a typical proportion of the time that the motor will be energised positively for the low speed drive mode. The value of Z may be constant during operation of the motor or it could be modified according to prior or current operating motor parameters.

The program looping block 57 outputs various motor control data. This includes braking data 55 and PWM data 56. The braking data is output from the program looping block when the motor controller 3 requires the motor to be braked.

The braking data 55 is received by a braking override block 53. The braking override block 53 intercepts the commutation data output from the drive pattern block 52. While the braking data 55 indicates braking is desired, the block 53 replaces drive commutation data with braking commutation control data.

The PWM block 54 receives the drive commutation data from drive pattern block 52, or the braking commutation signals from the braking override block 53. The PWM block also receives PWM control data 56 that is output from the program looping block 57.

The PWM block 54 consists of motor driver power electronics such as power transistors or similar devices. The PWM block 54 receives commutation data. The commutation data usually consists of low level signals output from digital electronics devices. The PWM block 54 amplifies them to become signals suitable for driving motors.

PWM data is supplied to the PWM block 54. The PWM data corresponds to the magnitude of desired electrical drive current, or the desired rate of motor acceleration or deceleration. The magnitude of the drive or braking commutation is therefore controllable by the program looping block 57.

Figure 5:
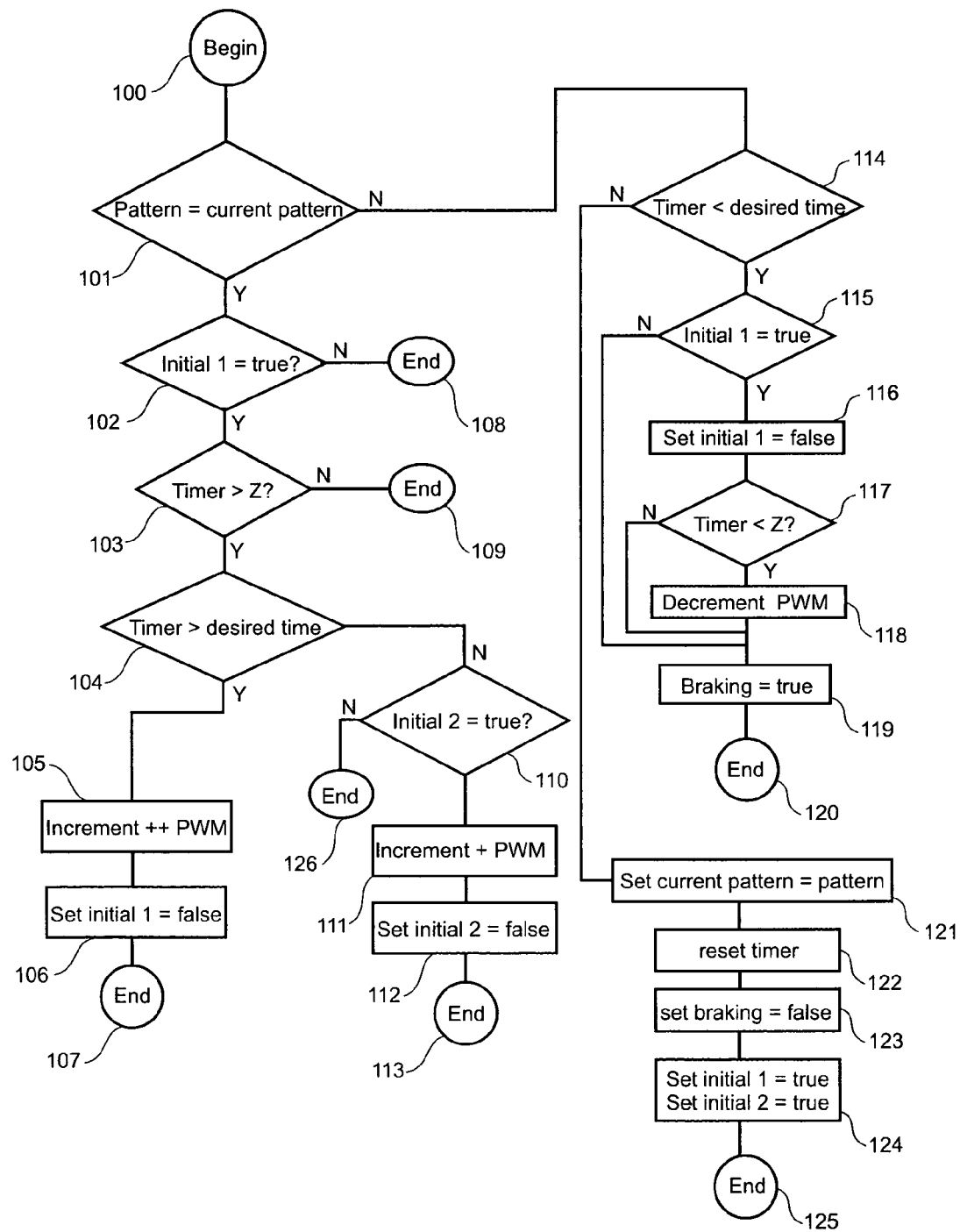
FIG. 5 illustrates a flow diagram of low speed motor operation according to one embodiment of the present invention.

FIG. 5 illustrates an embodiment of the motor control algorithm of the present invention. The algorithm is presented as a series of steps and decisions that are based on various motor operation characteristics.

The algorithm has several operating parameters. These are a present pattern parameter, a timer value representing the time t since the last pattern change occurred, the time T representing the desired time for the next pattern change, the percentage variable Z representing a fraction of desired time T and a pair of Boolean parameters initial 1 and initial 2.

The algorithm should be looped at a higher speed than the frequency of pattern signal changes to ensure the most accurate motor control. However, the algorithm could be run at a lower speed if suppressed motor noise and a high level of accuracy is not a design consideration.

The algorithm initiates at control step 100. The first time the algorithm is initiated the timers are reset and Boolean parameters initial 1 and initial 2 are set to true.

The algorithm is designed to operate the motor under three main scenarios. These are when the rotor is rotating too fast, too slowly, or at approximately the desired speed.

If the pattern change occurs earlier than time Z, the rotor is rotating too fast. If the pattern change occurs later than desired time T, the rotor is rotating too slowly. The pattern change occurs between time Z and time T when the rotor rotating at approximately the desired speed.

With reference to FIG. 5, an embodiment of the motor control technique of the present invention will now be described when the rotor is rotating too slowly.

The pattern from the output pattern block 50 is compared to the stored pattern at step 101. The stored pattern represents the current rotor position relative to the stator. The program proceeds to block 102 if the read pattern matches the stored pattern. At block 102 the initial 1 Boolean is reviewed. The program proceeds to block 103 if the initial 1 Boolean is true.

The initial 1 Boolean is used to diverge the algorithm according to other program parameter that may have changed or events that may have occurred.

The current timer value t is compared to time Z at block 103. The algorithm ends when t<Z. The algorithm will continually loop to end block 109 unless the pattern were to change or until the timer reaches or becomes greater than time Z.

The program restarts at block 100 upon reaching end block 109, or any other end block in the program.

The program will progress to block 104 from block 103 when time Z has elapsed. Initially, the timer value t will be between time Z and desired time T if the pattern remains unchanged. Therefore, the program will progress to block 110 from block 104.

The initial 2 Boolean is true and therefore the PWM block 54 is provided with a signal 56 to increment the motor power at step 111. The increased motor power accelerates the motor.

The initial 2 Boolean is set to true Abe at step 112 and the program restarts at block 100.

Therefore the motor is accelerated by incrementing the driving power when a pattern change does not occur within the elapsed time Z.

If the pattern remains unchanged, the program will continue to loop through to block 110 where the Boolean initial 2 is recognised as being set to false. The program will then end at block 126 and restart at block 100.

The timer value t will become greater than desired time T if the pattern remains unchanged. The program will loop to block 104 where the timer is recognised as being greater than desired time T. The program will subsequently progress to block 105 where the power supplied to the motor by PWM block 54 is incremented further.

The inventors have ascertained that motor stalling is best avoided by a substantial increase in driving power until a pattern change occurs. Therefore the second increment in power may be substantially greater than the first increment to attempt to avoid potential motor stall The program will subsequently progress to block 106 where Boolean initial 1 is set to false. The program then ends at block 107 and restarts at block 100.

The program will loop to end block 108 as Boolean initial 1 has been set to false. This loop will continue until a pattern change occurs and is recognised by block 101.

Therefore the motor is continually supplied with the substantially increased driving power until a pattern change occurs.

The program then progresses to block 114 after the pattern change is detected at block 101. Block 101 compares the timer value t to the desired time T. The program progresses to block 121 as timer t is larger than desired time T.

The pattern variable is set to the new changed pattern at block 121. The program then resets the timer value t at block 122 and sets the braking Boolean to false at block 123 if it were not already.

By setting the braking Boolean to false, any braking commutation cycle initiated elsewhere in the algorithm is deactivated and a driving commutation is initiated.

Booleans initial 1 and initial 2 are both set to true at subsequent block 124 and the program ends and block 125.

The motor control technique of the present invention as embodied in FIG. 5 will now be described when the rotor is rotating at approximately the desired speed.

The program begins or restarts at block 100. The program continually loops through the program to end block 109 until either the pattern changes at block 101 or the timer value t is greater than time Z.

The current timer value t is compared to time Z at block 103. The program will proceed to block 104 when the elapsed time is greater than time Z.

The program will proceed to block 110 when the timer value t is between time Z and desired time T. Boolean initial 2 is true for the first time block 110 is entered. Subsequently, the motor drive power is incremented at block 111 and the initial 2 Boolean is set to false at block 112. The program then ends at block 113 and restarts.

The program will subsequently loop to end block 126 until either the pattern changes or the timer value t becomes greater than desired time T.

The program proceeds from block 114 to block 115 if a pattern change occurs when the timer value t is between time Z and time T. Boolean initial 1 is true and the program proceeds to block 116 where it is set to false.

A pattern change occurring between time Z and time T indicates the motor is rotating at approximately the desired speed The current timer value t is compared to the time Z at block 117. If the time value t is greater than time Z, the program proceeds to block 119 where a braking commutation is initiated. The program then ends at block 120 and restarts at block 100.

The program will continue to loop to block 120 until either a pattern change occurs or the timer value t becomes greater than the desired time T. The program will progress to blocks 121, 122, 123, 124, 125 when the timer value t is greater than desired time T at block 114. The timer will be rest and the pattern variable set to the current pattern as supplied by output pattern block 50. The braking commutation will also be disengaged and the initial 1 and initial 2 Booleans set to true.

Therefore the motor is captured within a motor drive cycle that accelerates then decelerates the motor when it is rotating at approximately the desired speed.

The motor control technique of the present invention as embodied in FIG. 5 will now be described when the rotor is rotating too fast.

The motor control technique initiates at control step 100. The program continually loops through the program to end block 109 until either the pattern changes at block 101 or the timer value t becomes greater than time Z.

If the rotor is rotating too fast, a pattern change will occur earlier than expected.

The program proceeds from block 101 where the pattern change is detected to block 114. At block 114, the time value t is compared to desired time T. The timer value t is less than the desired time T and therefore the program proceeds to block 115.

At block 115, the initial 1 Boolean is true and the program proceeds to block 116 where initial 1 is set to false. The timer value t is compared to time Z at block 117. The pattern change occurs before time Z has elapsed, when the rotor is rotating too fast. The commutation power supplied to the motor is subsequently decremented at block 118. The power is decremented only once if the rotor rotation speed is such that pattern changes occur before time Z.

A braking commutation sequence is initiated at block 119. The program subsequently ends at block 120 and restarts at block 100. The program will then continue to loop to block 120 until the timer value t becomes greater than desired time T. Braking is continually applied to the motor until the timer value t is greater than desired time T.

Therefore the power supplied to the motor is reduced and braking is applied until the desired time T has elapsed.

The program will proceed from block 114 to block 121 when the timer value t becomes greater than desired time T.

The pattern variable is set to the new changed pattern at block 121. The program then resets the timer value t at block 122 and sets the braking Boolean to false at block 123.

Booleans initial 1 and initial 2 are both set to true at subsequent block 124 and the program ends at block 125.

An example algorithm that embodies the present invention has been described. The algorithm is most appropriately implemented by a microprocessor, however, each of the steps or blocks in the algorithm could alternatively be implemented by discrete electronic devices that are adapted to process the steps of the algorithm accordingly.

It can be appreciated that where commutation of the motor is not based on pattern changes, the changing of the pattern in the program algorithm could equally be replaced with any other event that corresponds to angular rotation or an angular position change of the motor.

Figure 6:
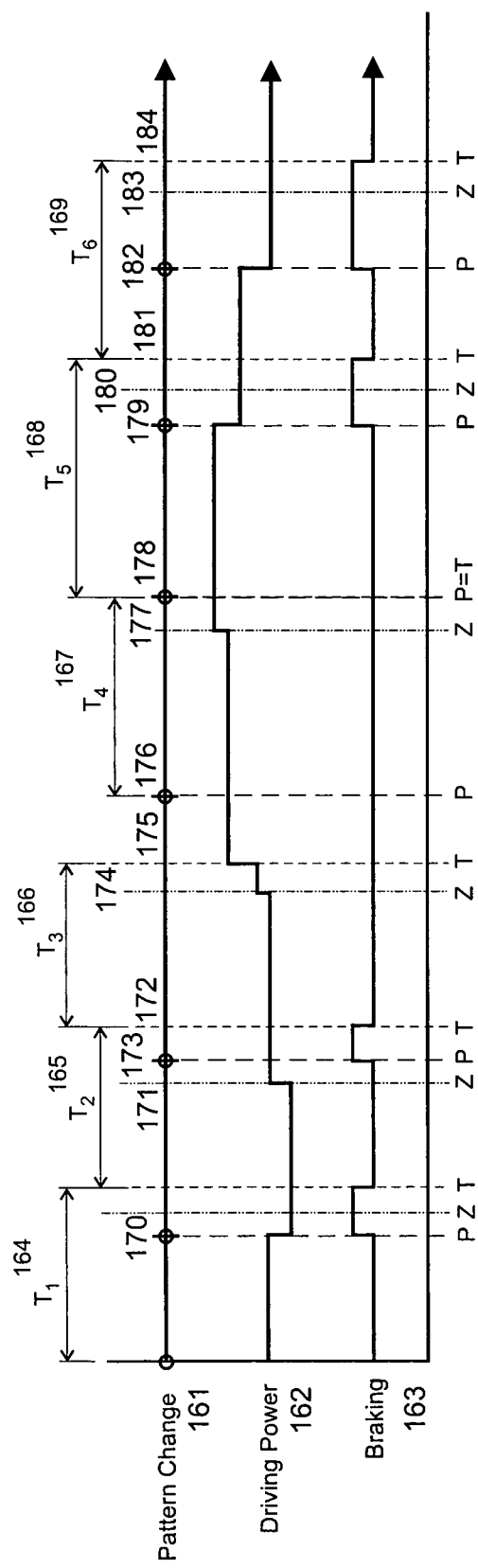
FIG. 6 shows a timeline of an example operating sequence.

FIG. 6 is a timeline of an example motor operating sequence showing the occurrence of pattern changes 161, driving commutation power 162 and when braking is applied 163, all in accordance with the slow speed motor drive technique of present invention.

Time period T1 indicates the desired time period 164 for a given rotation speed of the motor. The pattern change occurs earlier than expected. A braking commutation sequence is applied to the motor until the elapse of time period T1. The driving power to the motor 162 is also decremented.

Time period T2 indicates the desired time period 165 starting from the elapse of the previous time period T1 164. The driving power to the motor is incremented when time period Z has elapsed. The pattern change 173 occurs between time periods Z 171 and T 172. A braking commutation sequence is applied to the motor from the time the pattern change 173 occurs to the elapse of the time period T2 165.

Time period T3 166 begins when the previous desired time T2 165 elapses. The driving commutation power is increased when time period Z 174 has elapsed, and again when time period T 175 has elapsed.

Time period T4 167 begins from the occurrence of the late pattern change 176. Time period T4 indicates the desired time period for the next pattern change. The driving commutation power is incremented when time period Z 177 has elapsed. The pattern change occurs at the desired time period T 178. A braking commutation sequence is therefore not applied to the motor.

Time period T5 168 begins upon the elapse of the previous desired time T4 167. The next pattern change 179 occurs arrives before time period Z 180. A braking commutation sequence is applied to the motor from time period Z until time period T 181 has elapsed. The driving commutation power supplied to the motor is also decremented from the early occurrence of pattern change 179 until the elapse of time period T 168.

Time period T6 169 begins from the elapse of the previous desired time T5 168. A subsequent pattern change occurs 182 before time period Z 183. A braking commutation sequence is applied to the motor from the arrival of the pattern change 182 until time period 169 has elapsed. The driving commutation power supplied to the motor is also decremented from the early occurrence of the pattern change 182 until the elapse of time period T6 169.

The invention claimed is:

1. A method of operating a motor in a laundry machine, said method comprising:
   operating the motor in a low speed mode which is at a speed reduced from a typical motor operating speed, wherein the reduced speed is less than 20 rpm; and
   sensing an event corresponding to a change in angular position of said motor, wherein
      if the event occurs between a first time threshold and a second time threshold, the method comprises slowing the motor, and
      if the event has not occurred by the first time threshold, the method comprises increasing the drive power to the motor.

2. The method as claimed in claim 1 wherein said motor is an electronically commutated motor.

3. The method as claimed in claim 1 wherein the first time threshold is an estimated time to the occurrence of the event.

4. The method as claimed in claim 1 wherein the second time threshold is less than said first time threshold.

5. The method as claimed in claim 1 wherein the second time threshold that is between 80% and 95% of said first time threshold.

6. The method as claimed in claim 1 wherein the event is a series of events that correspond to changes in angular position of said motor.

7. The method as claimed in claim 1 wherein the driving power to the motor is increased if the event has not occurred by the second time threshold.

8. The method as claimed in claim 1 wherein the motor is braked until the elapse of the first time threshold if the event occurs before the first time threshold.

9. The method as claimed in claim 1 wherein the driving power to said motor is decreased if the event occurs before said second time threshold.

10. The method as claimed in claim 1 wherein the motor is adapted to drive a horizontal axis laundry washing machine.

11. The method as claimed in claim 1 wherein the typical motor operating speed is approximately 1000 rpm.

12. A motor control system adapted to operate a motor in a laundry machine, the system comprising:
   a low speed mode in which the motor is operated at a speed reduced from a typical motor operating speed, wherein the reduced speed is less than 20 rpm; and
   a sensor adapted to sense, during operation in the low speed mode, an event that corresponds to a change in angular position of said motor, wherein
      if the event occurs between a first time threshold and a second time threshold, the system slows the motor, and
      if the event has not occurred by the first time threshold, the system increases the drive power to the motor.

13. The system as claimed in claim 12 wherein said motor is an electronically commutated motor.

14. The system as claimed in claim 12 wherein the first time threshold is an estimated time to the occurrence of the event.

15. The system as claimed in claim 12 to wherein the second time threshold is less than said first time threshold.

16. The system as claimed in claim 12 wherein the second time threshold is between 80% and 95% of said first time threshold.

17. The system as claimed in claim 12 wherein the event is a series of events that correspond to changes in angular position of said motor.

18. The system as claimed in claim 12 wherein the driving power to the motor is increased if the event has not occurred by the second time threshold.

19. The system as claimed in claim 12 wherein the motor is braked until the elapse of the first time threshold if the event occurs before the first time threshold.

20. The system as claimed in claim 12 wherein the driving power to said motor is decreased if the event occurs before said second time threshold.

21. The system as claimed in claim 12 wherein the motor is adapted to drive a horizontal axis laundry washing machine.

22. The system as claimed in claim 12 wherein the typical motor operating speed is approximately 1000 rpm.

23. A laundry machine comprising:
   a cabinet,
   a drum mounted in said cabinet rotatable about at least a substantially horizontal axis,
   a motor connected to said drum for driving rotation thereof,
   a motor control system for causing operation of said motor in a low speed mode which is at a speed reduced from a typical motor operating speed, wherein the reduced speed is less than 20 rpm,
   said system having a sensor adapted to sense an event that corresponds to a change in an angular position of said motor, wherein during operation in the low speed mode, if the event occurs between a first time threshold and a second time threshold, the motor is slowed, and if the event has not occurred by the first time threshold, drive power to the motor is increased.

24. A laundry machine as claimed in claim 23, wherein said motor is an electronically commutated motor.

25. A laundry machine as claimed in claim 23 wherein the first time threshold is an estimated time to the occurrence of the event.

26. A laundry machine as claimed in claim 23 wherein the second time threshold is less than said first time threshold.

27. A laundry machine as claimed in claim 23 wherein the second time threshold is between 80% and 95% of said first time threshold.

28. A laundry machine as claimed in claim 23 wherein the event is a series of events that correspond to changes in angular position of said motor.

29. A laundry machine as claimed in claim 23 wherein the driving power to the motor is increased if the event has not occurred by the second time threshold.

30. A laundry machine as claimed in claim 23 wherein the motor is braked until the first time threshold has elapsed if the event occurs before the first time threshold.

31. A laundry machine as claimed in claim 23 wherein the driving power to said motor is decreased if the event occurs before said second time threshold.

32. A laundry machine as claimed in claim 23 wherein the typical motor operating speed is approximately 1000 rpm.

* * * * *